United States Patent
Lokamathe et al.

(10) Patent No.: US 10,601,854 B2
(45) Date of Patent: Mar. 24, 2020

(54) COMPREHENSIVE RISK ASSESSMENT IN A HETEROGENEOUS DYNAMIC NETWORK

(71) Applicant: Tata Consultancy Services Limited, Mumbai (IN)

(72) Inventors: Shivraj Vijayshankar Lokamathe, Bengaluru (IN); Rajan Mindigal Alasingara Bhattachar, Bengaluru (IN); Meena Singh Dilip Thakur, Bengaluru (IN); Balamuralidhar Purushothaman, Bengaluru (IN)

(73) Assignee: Tata Consultancy Services Limited, Mumbai (IN)

( * ) Notice: Subject to any disclaimer, the term of this patent is extended or adjusted under 35 U.S.C. 154(b) by 158 days.

(21) Appl. No.: 15/476,436

(22) Filed: Mar. 31, 2017

(65) Prior Publication Data
US 2018/0048669 A1 Feb. 15, 2018

(30) Foreign Application Priority Data

Aug. 12, 2016 (IN) .............................. 201621027692

(51) Int. Cl.
*H04L 29/06* (2006.01)
*H04W 12/12* (2009.01)
(Continued)

(52) U.S. Cl.
CPC .......... *H04L 63/1433* (2013.01); *G06F 30/20* (2020.01); *G06N 5/04* (2013.01);
(Continued)

(58) Field of Classification Search
CPC ............. H04L 63/1433; H04L 63/1408; G06F 17/5009; G06N 5/04; G06Q 10/0635; H04W 12/12
(Continued)

(56) References Cited

U.S. PATENT DOCUMENTS 8,813,236 B1 * 8/2014 Saha ................... H04L 63/1408
726/22
9,100,430 B1 * 8/2015 Seiver ................. H04L 63/1433
(Continued)

FOREIGN PATENT DOCUMENTS

CN 101655787 A 2/2010

OTHER PUBLICATIONS

Poolsappasit et al., "Dynamic Security Risk Management Using Bayesian Attack Graphs", IEEE Transactions on Dependable and Secure Computing, vol. 9, Issue: 1, pp. 1-15, (2011) http://cs.du.edu/~rdewri/data/MyPapers/Journals/2011TDSC.pdf.
(Continued)

*Primary Examiner* — Kambiz Zand
*Assistant Examiner* — Mahabub S Ahmed
(74) *Attorney, Agent, or Firm* — Finnegan, Henderson, Farabow, Garrett & Dunner LLP

(57) ABSTRACT

Systems and methods of the present disclosure provide comprehensive risk assessment in a heterogeneous dynamic network. The framework enables 'view' and 'analyses' of complete architecture simultaneously in information view, deployment view, business view and security view. Fundamentally, data pertaining to information flow between a plurality of nodes within systems in a network is identified. One or more affected nodes or paths therebetween are identified and attack risk is computed. The graph based framework supports multiple threat models for threat evaluation. It also provides mitigation plans which will reflect reduced risk in the business view and incorporates attack tree simulations to evaluate dynamic behavior of a system under attack.

12 Claims, 8 Drawing Sheets

(51) Int. Cl.
*G06F 30/20* (2020.01)
*G06N 5/04* (2006.01)
*G06Q 10/06* (2012.01)

(52) U.S. Cl.
CPC ..... *G06Q 10/0635* (2013.01); *H04L 63/1408* (2013.01); *H04W 12/12* (2013.01)

(58) Field of Classification Search
USPC .......................................................... 726/25
See application file for complete search history.

(56) References Cited

U.S. PATENT DOCUMENTS

| | | | |
|---|---|---|---|
| 9,166,997 B1* | 10/2015 | Guo | H04L 63/1433 |
| 9,210,185 B1* | 12/2015 | Pinney Wood | G06F 16/9024 |
| 9,276,951 B2* | 3/2016 | Choi | G06N 7/005 |
| 9,292,695 B1* | 3/2016 | Bassett | G06F 21/577 |
| 9,467,455 B2* | 10/2016 | Seiver | H04L 63/101 |
| 9,635,049 B1* | 4/2017 | Oprea | H04L 63/145 |
| 9,967,265 B1* | 5/2018 | Peer | H04L 63/20 |
| 9,992,219 B1* | 6/2018 | Hamlet | G06F 16/9024 |
| 10,015,177 B2* | 7/2018 | Muddu | G06F 16/285 |
| 10,083,073 B2* | 9/2018 | Ambichl | G06F 11/30 |
| 10,164,995 B1* | 12/2018 | Fang | G06F 16/9024 |
| 10,467,322 B1* | 11/2019 | Cao | G06F 17/00 |
| 2002/0188577 A1* | 12/2002 | Vidhani | G06F 30/367 706/14 |
| 2005/0050351 A1 | 3/2005 | Cain | |
| 2005/0193430 A1* | 9/2005 | Cohen | G06F 21/577 726/25 |
| 2006/0015377 A1* | 1/2006 | Hoogs | G06Q 10/063 705/7.28 |
| 2009/0077666 A1* | 3/2009 | Chen | G06F 21/577 726/25 |
| 2009/0327195 A1* | 12/2009 | Iscen | G06N 5/042 706/47 |
| 2010/0077278 A1* | 3/2010 | Wang | G06K 9/00885 714/752 |
| 2010/0082513 A1* | 4/2010 | Liu | H04L 63/1458 706/46 |
| 2010/0163621 A1* | 7/2010 | Ben-Asher | G05D 1/0088 235/412 |
| 2011/0137703 A1* | 6/2011 | Dugan | G06Q 10/0635 705/7.28 |
| 2013/0227695 A1* | 8/2013 | Shankar | G06F 21/577 726/25 |
| 2015/0046384 A1* | 2/2015 | Eck | G06F 17/18 706/52 |
| 2015/0058993 A1* | 2/2015 | Choi | H04L 63/1433 726/25 |
| 2015/0278729 A1* | 10/2015 | Hu | G06Q 10/0635 705/7.28 |
| 2015/0288712 A1* | 10/2015 | Jones | H04L 63/1433 726/25 |
| 2016/0063392 A1* | 3/2016 | Heckel | G06N 7/005 706/46 |
| 2016/0171533 A1* | 6/2016 | Cambot | H04L 67/20 705/14.53 |
| 2016/0205122 A1* | 7/2016 | Bassett | G06F 21/577 726/23 |
| 2016/0247170 A1* | 8/2016 | Soulakis | G06Q 30/0201 |
| 2016/0261608 A1* | 9/2016 | Hu | H04L 63/126 |
| 2016/0337389 A1* | 11/2016 | Letal | H04L 63/1425 |
| 2017/0063785 A1* | 3/2017 | Durniak | H04L 63/0428 |
| 2017/0063909 A1* | 3/2017 | Muddu | H04L 63/1408 |
| 2017/0063911 A1* | 3/2017 | Muddu | H04L 43/045 |
| 2017/0075749 A1* | 3/2017 | Ambichl | G06F 11/079 |
| 2017/0134415 A1* | 5/2017 | Muddu | G06F 3/0482 |
| 2017/0193378 A1* | 7/2017 | Fertig | G06Q 10/0631 |
| 2017/0244740 A1* | 8/2017 | Mahabir | H04L 63/1433 |
| 2018/0011972 A1* | 1/2018 | Rajan | G16H 50/20 |
| 2018/0197128 A1* | 7/2018 | Carstens | G06Q 10/0635 |
| 2018/0219917 A1* | 8/2018 | Chiang | G06Q 10/0635 |
| 2018/0285797 A1* | 10/2018 | Hu | G06Q 10/0635 |

OTHER PUBLICATIONS

Xie et al., "Network Security Risk Assessment Based on Attack Graph", Journal of Computers, 2013 Academy Publisher, vol. 8, No. 9, pp. 2339-2347,(2013) https://pdfs.semanticscholar.org/745b/ffe75c79a5528fad7b971f6f603b2eaccad5.pdf.

* cited by examiner

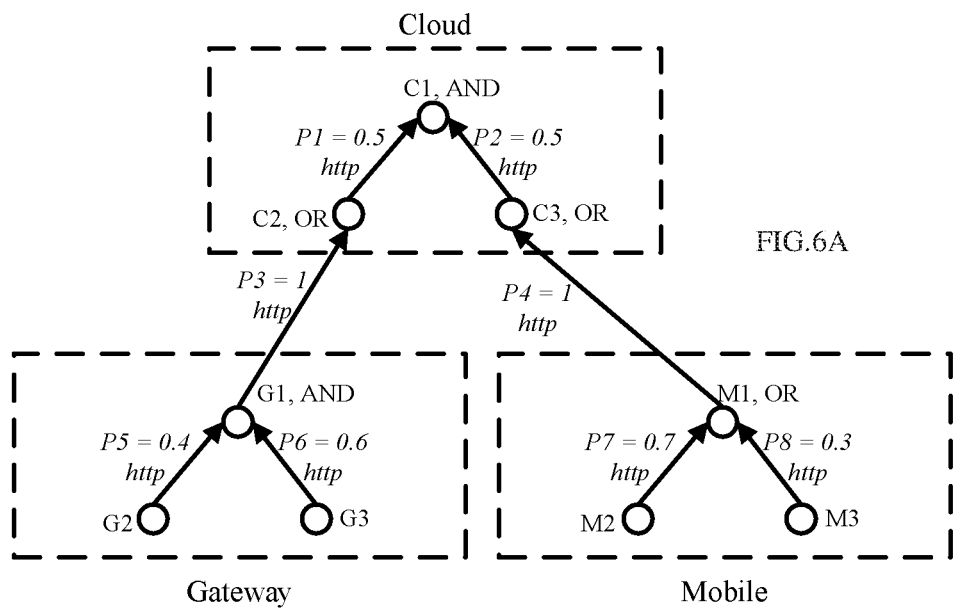
FIG.6A
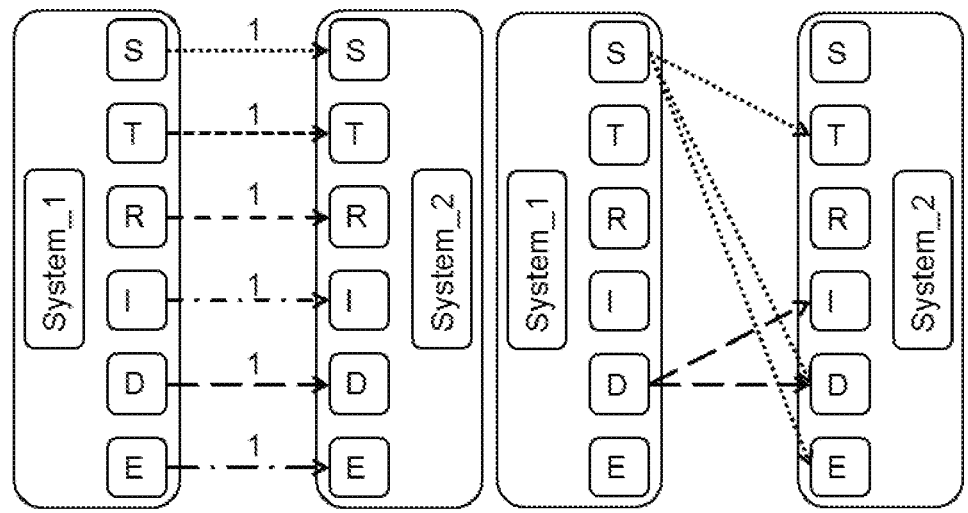
FIG.6B
FIG.6C

COMPREHENSIVE RISK ASSESSMENT IN A HETEROGENEOUS DYNAMIC NETWORK

PRIORITY CLAIM

This U.S. patent application claims priority under 35 U.S.C. § 119 to: Indian Application No. 201621027692 filed on Aug. 12, 2016. The entire contents of the aforementioned application are incorporated herein by reference.

TECHNICAL FIELD

The embodiments herein generally relate to modeling and analysis of cybersecurity threats in a network, and more particularly to systems and methods for risk assessment in a heterogeneous dynamic network.

BACKGROUND

Traditionally known threat modeling tools evaluate and compute results on static topologies of networks. Major configuration changes are required to evaluate any changes in design of networks which can be time consuming, incur cost and may not be able to capture essential security and privacy parameters. Networks are growing rapidly and enormous data exchanges are happening. Current approaches perform risk and threat analysis at deployment view only. There lacks a view for data scientists to assess information flow view.

The current approaches have a data mapping to systems and subsystems using metadata to perform static analysis. There lacks a systematic formal representation approach to solutions when a network spans and data grows larger. With the growing Internet of Things (IoT), heterogeneous protocols (such as CoAP, MQTT) are used to connect systems and to evaluate "Threat and Risk" of any such connected systems current tools lack impact due to different type of protocols used for communication.

Most of the analysis performed by conventional approaches show vulnerabilities and security measures at the deployment view only. Very few tools like Amenaza® offer only attack simulation analysis for a system with no co-relation of the impact between different layers of the system.

Traditional metrics including threat count, vulnerability count, mapping with high, medium and low, comparison with other organizations, and the like evaluate security paradigm, but from a business perspective; information translations are not done to analyze inter-layer impact.

Existing tools provide risk assessment with their own defined metrics for the overall network. User cannot have a risk estimation and visualization in a partitioned heterogeneous network.

SUMMARY

Embodiments of the present disclosure present technological improvements as solutions to one or more of the above-mentioned technical problems recognized by the inventors in conventional systems.

In an aspect, there is provided a processor implemented method comprising: receiving data pertaining to information flow between a plurality of nodes identified within systems in a network; identifying one or more affected nodes from the plurality of nodes and one or more affected paths therebetween; and computing attack risk at the one or more affected nodes.

In another aspect, there is provided a system comprising: one or more data storage devices operatively coupled to the one or more processors and configured to store instructions configured for execution by the one or more processors to: receive data pertaining to information flow between a plurality of nodes identified within systems in a network; identify one or more affected nodes from the plurality of nodes and one or more affected paths therebetween; and compute attack risk at the one or more affected nodes.

In yet another aspect, there is provided a computer program product comprising a non-transitory computer readable medium having a computer readable program embodied therein, wherein the computer readable program, when executed on a computing device, causes the computing device to: receive data pertaining to information flow between a plurality of nodes identified within systems in a network; identify one or more affected nodes from the plurality of nodes and one or more affected paths therebetween; and compute attack risk at the one or more affected nodes.

In an embodiment of the present disclosure, the one or more hardware processors are further configured to compute propagated risk on neighboring nodes of the one or more affected nodes.

In an embodiment of the present disclosure, the one or more hardware processors are further configured to compute an aggregated risk at the one or more affected nodes based on the propagated risk.

In an embodiment of the present disclosure, the one or more hardware processors are further configured to compute one or more of business impact loss, information loss impact and financial impact loss based on the aggregated risk.

In an embodiment of the present disclosure the one or more hardware processors are further configured to generate a mitigation plan based on one or more of the business impact loss, the information loss impact and the financial impact loss, the mitigation plan comprising one or more of: providing one or more alternate source or path for the data to be derived or propagated respectively; modifying constraints imposed on the information flow from logical conjunction ("AND") to logical disjunction ("OR") or vice-versa; isolating at least one of the one or more affected nodes or the one or more affected paths therebetween; deploying data encryption scheme; and implementing diagnostic measures to measure health of the network.

In an embodiment of the present disclosure, the business impact loss is based on weight or probability associated with business impact loss and the aggregated risk; the information loss impact is based on weight or probability associated with information loss and the aggregated risk; and the financial impact loss is based on weight or probability associated with financial impact loss and the aggregated risk.

In an embodiment of the present disclosure the one or more hardware processors are further configured to compute attack risk by identifying attack vectors in the network and influence vectors corresponding to the propagated risk of the attack vectors on the neighboring nodes.

In an embodiment of the present disclosure the one or more hardware processors are further configured to compute propagated risk by: receiving pre-defined bipartite graphs of transitions based on the attack vectors and the influence vectors; and estimating attack probability based on the bipartite graphs, pre-defined weights assigned to the propagated risk and probability of selection of a path in the network.

In an embodiment of the present disclosure the one or more hardware processors are further configured to simulate a "what-if" condition wherein an attack is simulated to affect one or more nodes and a conditional analysis assessment is conducted.

It is to be understood that both the foregoing general description and the following detailed description are exemplary and explanatory only and are not restrictive of the embodiments of the present disclosure, as claimed.

BRIEF DESCRIPTION OF THE DRAWINGS

The embodiments herein will be better understood from the following detailed description with reference to the drawings, in which:

FIG. 6A illustrates an exemplary information flow view of a network of interconnected systems, in accordance with an embodiment of the present disclosure to analyze cascading attack impact on neighboring nodes;

FIG. 6B illustrates a one-to-one mapping between STRIDE models of two systems, using bipartite graph, in accordance with the present disclosure;

FIG. 6C illustrates interrelated influences between STRIDE models of two systems, using bipartite graph, in accordance with the present disclosure;

Figure 1:
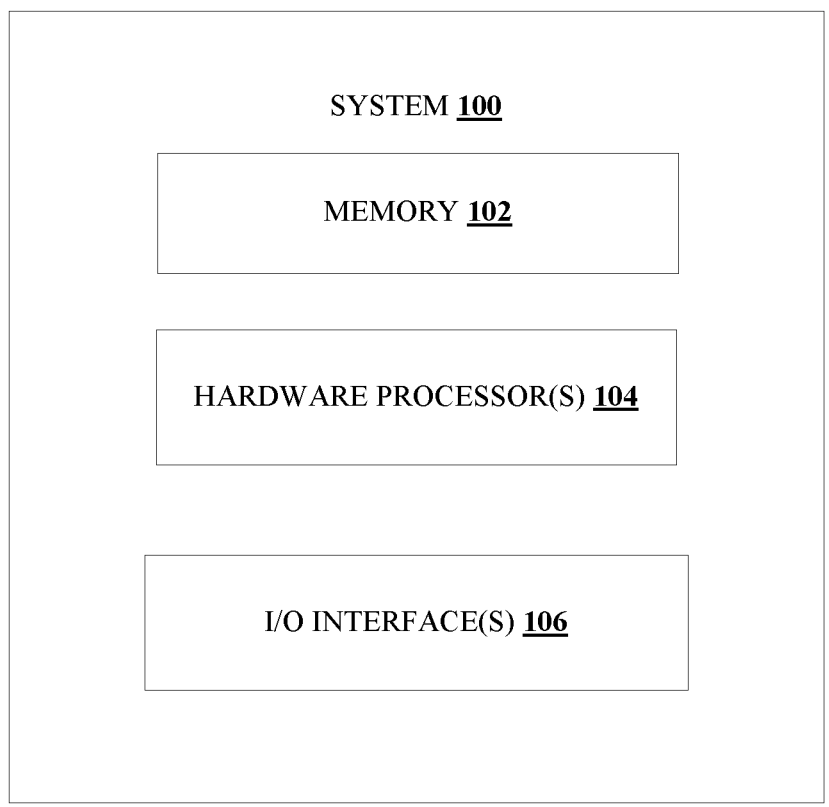
FIG. 1 illustrates an exemplary block diagram of a system for comprehensive risk assessment in a heterogeneous dynamic network in real time, in accordance with an embodiment of the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Before setting forth the detailed explanation, it is noted that all of the discussion below, regardless of the particular implementation being described, is exemplary in nature, rather than limiting.

Systems and methods of the present disclosure provide a graph based framework that considers the heterogeneity of networks and protocols used to interconnect systems therein which make risk evaluation method of the present disclosure dynamic and real time. The framework enables to 'view' and 'analyze' complete architecture at four different layers (multi-view model) in real time:

Information flow View [Value added data flow],
Deployment View [Network of systems],
Business View [Results depict organization goals], and
Security level view [Based on device security level].

The framework can dynamically assess risk in information view and reflect impact simultaneously in deployment view and provide impact information in at least one of business view and security view.

Further systems and methods of the present disclosure help to identify critical paths in terms of risk exposure. The systems and methods of the present disclosure also facilitate identification of vulnerabilities, potential threats, simulate attacks, suggest mitigation and also by using web-crawling techniques add vulnerabilities, mitigation in real time to database. The risk metrics in business view provides better insights to business analyst associates to evaluate problems from a business implementation view (for instance, with respect to financial investments). Systems and methods of the present disclosure specify a risk computation methodology based on threat models and attack probabilities at node level. Risk estimation and visualization for partitioned network are provided based on security levels of the devices. Propagating risk from one node to its dependent nodes is an important aspect considered by systems and methods of the present disclosure.

In the context of the present disclosure, it may be noted that any reference to affected nodes may comprise of affected paths therebetween.

Referring now to the drawings, and more particularly to FIGS. 1 through 7, where similar reference characters denote corresponding features consistently throughout the figures, there are shown preferred embodiments and these embodiments are described in the context of the following exemplary system and method.

FIG. 1 illustrates an exemplary block diagram of a system 100 for comprehensive risk assessment in a heterogeneous dynamic network in real time, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2:
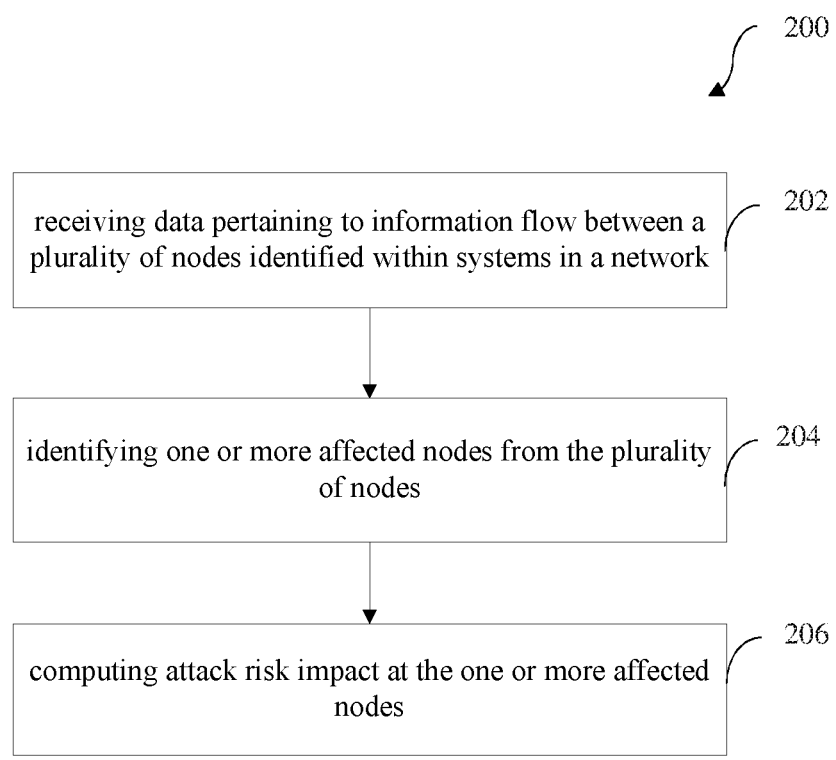
FIG. 2 illustrates an exemplary flow diagram of a method for comprehensive risk assessment in a heterogeneous dynamic network, in accordance with an embodiment of the present disclosure.

FIG. 2 illustrates an exemplary flow diagram of a method 200 for comprehensive risk assessment in a heterogeneous dynamic network, in accordance with an embodiment of the present disclosure. In an embodiment, the system 100 comprises one or more data storage devices or memory 102 operatively coupled to the one or more processors 104 and is configured to store instructions configured for execution of steps of the method 200 by the one or more processors 104.

Figure 3A:
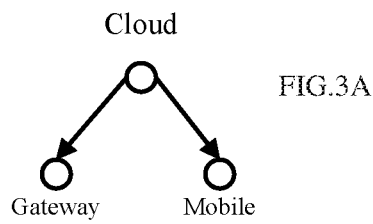
FIG. 3A, FIG. 3B and FIG. 3C illustrate deployment view, information flow view and network topology respectively of a network of interconnected systems, in accordance with an embodiment of the present disclosure.
Figure 3B:
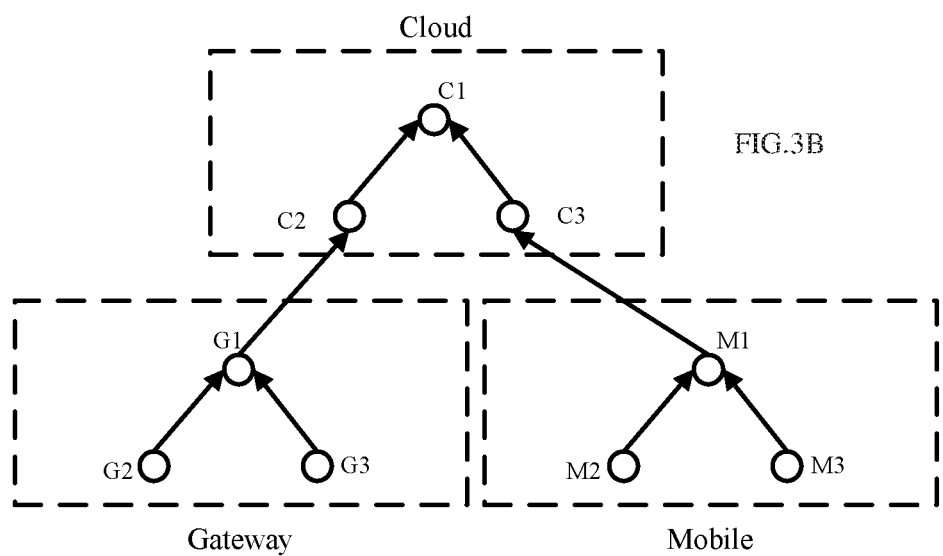
Figure 3C:
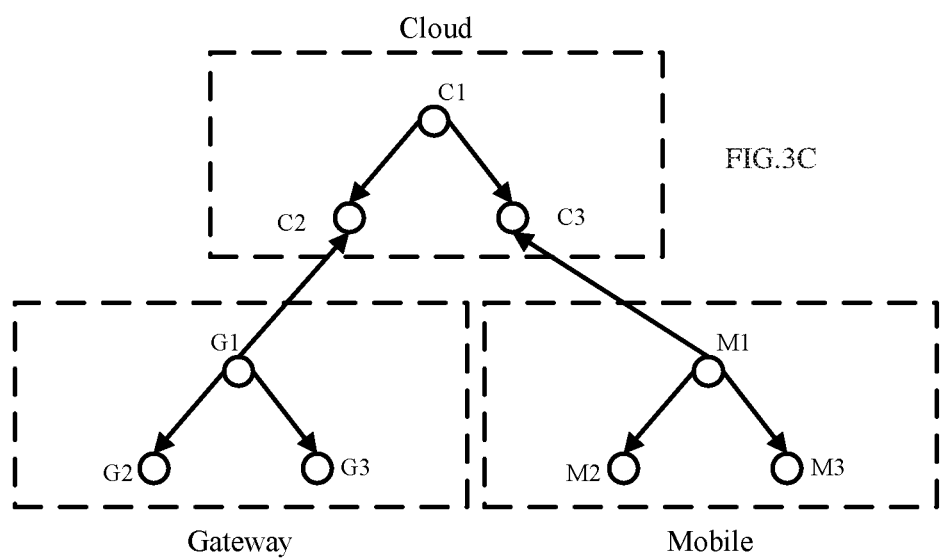

A complete network of interconnected systems is represented as a graph in three views: Information Flow View (FIG. 3B), Deployment View (FIG. 3A) and Business View (Refer FIG. 8 below). In Deployment View, individual systems are interconnected with directional links representing connectivity dependency. An overlay of information flow view on deployment view is shown in network topology (FIG. 3C). Systems identified include Cloud, Gateway, and Mobile.

Figure 4A:
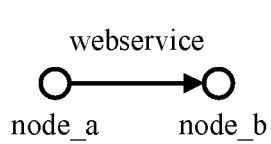
FIG. 4A illustrates interconnectivity between exemplary node_a and node_b of a system.
Figure 4B:
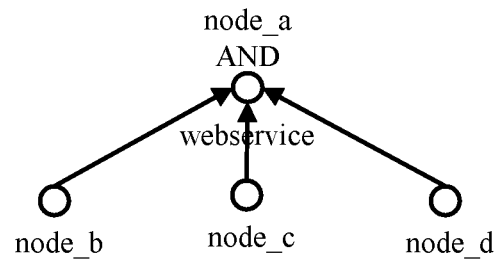
FIG. 4B and FIG. 4C illustrate interconnectivity between exemplary nodes with node_a representing a logical "AND" logic and a logical "OR" logic respectively.

In FIG. 4A, node_a depends on node_b for connectivity of information. The information flow is from node_b to node_a. Nodes represent 'AND' 'OR' logic. When a node represents 'AND' Logic as illustrated in FIG. 4B, it seeks information from all the sources, in case when any of the source information fails; the node fails. From FIG. 4B, node_a, node_b, node_c and node_d represent individual systems. In the example, operationally AND logic at node_a means; node_a can continue to function only when information from node_b, node_c and node_d continue to flow. If either of node_b, node_c, node_d fail; node_a also fails to propagate further processed information. In accordance with the present disclosure, in a k out of n logic (where k is the number of selected incoming edges and n is the maximum number of incoming edges), at least k incoming edges may be active. In the event that the number of edges available are more than k, the attack probabilities are arranged in a descending order of value and the highest k edges are considered for computation amongst them.

From FIG. 4B, node_b, node_c and node_d together provide information to node_a. For Risk computation, there are two approaches to consider:

Maximum Risk: At node_a it's the aggregation of risk of attacked nodes. Under the k out n scenario and also if the number of edges available are more than k, then the attack probabilities are arranged in descending order of value and the highest k edges with their attack probabilities are aggregated for computation.

System Continuity: Consider the maximum impact coming from either of, node_b, node_c or node_d. Under the k out n scenario and also if the number of edges are available more than k, then the attack probabilities are arranged in descending order of value and the highest amongst the available k edges is considered for computation.

Figure 4C:
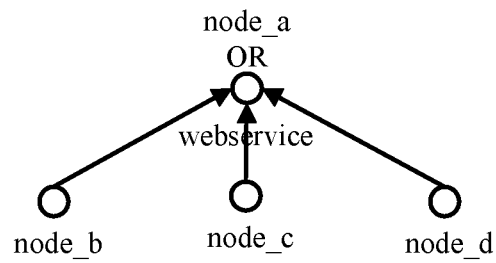

FIG. 4C illustrates OR logic at a node. Operationally, node_a, node_b, node_c and node_d represent individual systems. In the example OR logic at node_a means; node_a can continue to function in the worst case of when information from either node_b, node_c or node_d continue to flow. node_a can be termed as non-functional only when information flow from node_b, node_c and node_d stop. From FIG. 4C, node_a continues to work when either of node_b, node_c and node_d continue to provide information to node_a. For Risk computation, there are two approaches to consider:

Maximum Risk: At node_a consider the maximum impact coming from either of, node_b, node_c or node_d. Under the k out n scenario and also if the number of edges are available more than k, then the attack probabilities are arranged in descending order of value and the highest amongst the available k edges is considered for computation.

System Continuity: Consider the minimum impact coming from either of, node_b, node_c or node_d which ever edge is active. Under the k out n scenario, i.e. k=1, then the only active edge is considered for computation.

In Information Flow View, Individual systems are represented with single/several informational nodes. These information nodes are interconnected with directional links representing connectivity dependency. Referring to FIG. 3B, an example of information node representation of individual systems:

Cloud is represented with three information nodes i.e. C1, C2, C3

Gateway is represented with three information nodes i.e. G1, G2, G3

Mobile is represented with three information nodes i.e. M1, M2, M3

In the cloud representation at information node level, cloud is represented as a cluster of information nodes i.e. C1, C2 and C3. There is information flow within nodes represented by directional links. The links represent connectivity dependence between two information nodes. For instance, node C1 depends on node C2 for information. The information flow is from node C2 to C1. Therefore link direction represents source of information. Constraints of imposing 'AND' 'OR' Logic exists even in information view for the individual systems as shown in diagram. Therefore same logic of 'AND' 'OR' as in deployment view is incorporated at information node view.

The steps of the method 200 of the present disclosure will now be explained with reference to the components of the system 100 as depicted in FIG. 1 and the flow diagram 202. In an embodiment of the present disclosure, at step 202, the one or more processors 104 can receive data pertaining to information flow between a plurality of nodes identified within systems in a network. In an embodiment of the present disclosure, at step 204, the one or more processors 104 can identify one or more affected nodes from the plurality of nodes and one or more affected paths therebetween. In an embodiment, the one or more affected nodes may be identified by using the principles of scanning algorithms such as Breadth First Search (BFS) algorithm, where the root node is checked if it is impacted only after checking the 'AND' 'OR' constraints along the child nodes and risk computations. In an embodiment, machine learning or data analytics based on information associated with the nodes and edges can facilitate automatic identification of affected nodes. It may be noted that in the context of the present disclosure, affected nodes/edges may also refer to compromised nodes/edges. Every node in the graph has attributes which characterize the device. Change in one more attributes will identify an affected node.

In an embodiment of the present disclosure, at step 206, the one or more processors 104 can compute attack risk at the one or more affected nodes. In an embodiment, to represent threat impact as a risk factor, threat model such as STRIDE model is used. STRIDE stands for: S-Spoofing; T-Tampering; R-Repudiation; I-Information Loss; D-Denial of Service; E-Elevation of Privilege. STRIDE is represented as a vector [S,T,R,I,D,E]. The value range for each element is {0,1}. '1' represents impacted and '0' represents not impacted.

In accordance with the present disclosure, in general risk can be computed as

Risk=Impact*Likelihood

Likelihood: At each node Likelihood (probability of selecting a path) is evaluated using STRIDE. STRIDE gives classification of attacks. Therefore Likelihood of each STRIDE component is:

$$\text{Likelihood } ls_i = \sum_{j=1}^{M} T_{ij} l_j$$

For each l from 1 to 6 and $T_{ij}$ is 1 indicates presence of STRIDE component l in attack j Impact at a node: Let there be k business impacts $B_1, B_2, \ldots, B_k$ due to STRIDE. To capture this impact, an impact matrix $[B]_{k \times 6}$ is defined. Cumulative Business Impact at a node for each STRIIDE component $s_i$ is computed as $$Bls_i = \sum_{j=1}^{k} B[j, i]$$

Risk at a node due to each STRIDE component $s_i$ is $Rs_i = Bls_i * ls_i$

Figure 5:
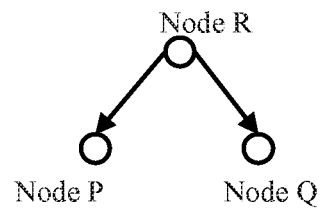
FIG. 5 illustrates an exemplary dependency graph with interconnectivity between nodes P, Q and R.

In an embodiment, the method 200 of the present disclosure further comprises computing propagated risk on neighboring nodes of the one or more affected nodes. FIG. 5 illustrates an exemplary dependency graph with interconnectivity between nodes P, Q and R. Likelihood vector based on STRIDE for nodes P and Q are computed based on the above method and are denoted as $ls_P$ and $ls_Q$ respectively and are under the control of their parent node R. For computing propagation, type of dependency of node R on P and Q, OR, AND k out of n are considered. Dependency proportion DeP is expressed as:

$$\Sigma_{i=1}^{\text{out degree of parent node } R} \text{Dep}_{v_i} = 1,$$

where $v_i$ is child node and $0 < \text{Dep}_{v_i} \leq 1$ $STRIDE_{prop}$ refers to actual propagation of STRIDE likelihood vector from children to parent. It is computed based on bipartite mapping. For example through spoofing attack on child node, tampering attack can be initiated on its parent. This way all possible combination of STRIDE vs STRIDE may be possible. To compute this, a $[\![STRIDE_{prop}]\!]_{6 \times c}$ matrix of order which includes likelihood of STRIDE propagation is considered. By default, $[\![STRIDE_{prop}]\!]_{6 \times c}$ is a diagonal matrix expressed as—

$$[\![STRIDE_{prop}]\!]_{6 \times c} = \begin{pmatrix} \uparrow & S & T & R & I & D & E \\ S & & & & & & \\ T & & & & & & \\ R & & & & & & \\ I & & & & & & \\ D & & & & & & \\ E & & & & & & \end{pmatrix}$$

$ls_R^P$ is the likelihood STRIDE vector with 6 STRIDE components $ls_i$ propagation from node P to R is computed as follows $$ls_{R_{ls_i}}^P = \sum_{J=1}^{6} STRIDE_{prop_R}^P[i][j]$$

In an embodiment, the method 200 of the present disclosure further comprises computing an aggregated risk at the one or more affected nodes based on the propagated risk. The aggregated risk RS may be expressed as—

$$RS = \sum_{i=1}^{6} Bls_i * ls_i = \sum_{i=1}^{6} Rs_i$$

In an embodiment, Likelihood Propagation for AND dependency for a parent node R having out degree out with children nodes $v_1, v_2, \ldots v_{out}$. Likelihood computation for each STRIDE component is given by—

$$ls_{R_{s_i}} = \sum_{j=1}^{out} Dep_{v_j} = ls_{R_{ls_i}}^{v_j}$$

In an embodiment, Likelihood Propagation for OR dependency for a parent node R having out degree out with children nodes $v_1, v_2, \ldots v_{out}$. Likelihood computation for each STRIDE component is given by—

$ls_R = \text{Max}_{i=1}^{out}\{Dep_{v_i} * \|ls_R^{V_i}\|\}$

In accordance with the present disclosure, impact propagation can be defined at each node and computed. In another embodiment, in a top down approach, impact factor flown down from parent nodes to children nodes in a ratio can be used to compute risk based on the likelihood.

FIG. 6A illustrates an exemplary information flow view of a network of interconnected systems, in accordance with an embodiment of the present disclosure to analyze cascading attack impact on neighboring nodes. When any information node is attacked; it is actually a system that has been attacked, therefore it is important to understand the impact on the attacked information node neighbors. Computing attack risk in accordance with the present disclosure comprises identifying attack vectors in the network and influence vectors corresponding to the propagated risk of the attack vectors on the neighboring nodes. Hence it is imperative to study how the STRIDE value is propagated from system to system as the information flow propagates. From FIG. 6A, it may be inferred that information is being passed from information node M1 (Mobile) to information node C3 (Cloud) through path P4 (system to system information propagation). For instance, any threat attack on information node M1 (Mobile) may also influence its neighboring information node C3 in multiple ways as its vulnerabilities may be different (Cloud) (belonging to another system) and neighboring node may also cause vulnerability in multiple ways.

Typical transition examples under Internet Of Things (IoT) include:
Mobile to Mobile
Gateway to Gateway
Cloud to Cloud
Mobile to Gateway
Mobile to Cloud
Gateway to Mobile
Gateway to Cloud
Cloud to Mobile
Cloud to Gateway In accordance with the present disclosure, the method 200 comprises computing propagated risk by receiving pre-defined bipartite graphs of transitions based on the attack vectors and the influence vectors; and estimating attack probability based on the bipartite graphs, pre-defined weights assigned to the propagated risk and probability of selection of a path in the network.

Figure 6D:
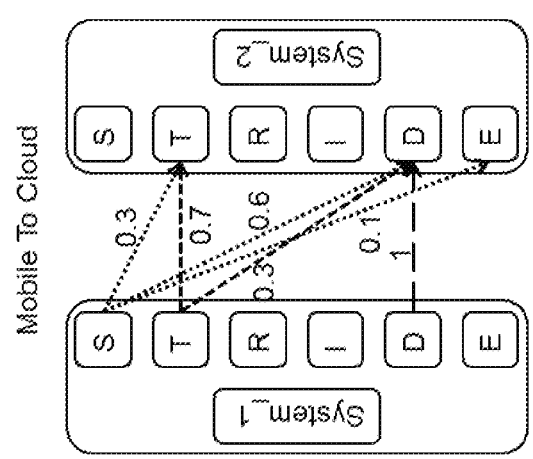
FIG. 6D illustrates an exemplary transition impact between STRIDE models of two systems, using bipartite graph, in accordance with the present disclosure.

As a first solution option (with an assumption that any impact on for example S of STRIDE will NOT influence other parameters of STRIDE evaluation on other system), it can be directly considered as a one-to-one mapping as shown in FIG. 6B using bipartite graph. As a second solution option (with an assumption that any impact on for example S of STRIDE may influence other parameters of STRIDE evaluation on other system), bipartite graphs (the bipartite graphs are strictly derived by a Subject Matter Expertise (SME) to show interrelated influences may be constructed as shown in FIG. 6C. From the bipartite graph of FIG. 6C, it may be inferred that propagation of STRIDE value from system_1 to system_2 influences other STRIDE parameters as well. S from system_1 influences T, D, E on the system_2. D from system_1 influences I and D on system_2. These edges are weighted. And system_2 will also have a STRIDE_INFLUENCE_VECTOR which can be used to configure the parameters to be considered for risk computation with STRIDE weights. The STRIDE weights are reconfigurable so as to consider the vulnerabilities and security capabilities of the device. The STRIDE weights are represented as [$W_p(S), W_p(T), W_p(R), W_p(I), W_p(D), W_p(E)$]. An example of such a transition impact is as shown in FIG. 6D.

$$E(W_p(j)) = W_p(j) \sum_{i \in Index} W_{ij} W_c(i)$$

where
Index∈{1,2,3,4,5,6}
j∈{1,2,3,4,5,6}
Where $W_c(i)$ signifies STRIDE vector values from the system_1 and $W_p(i)$ signifies STRIDE_INFLUENCE_VECTOR values of system_2.
E ($W_p(j)$) represents the result.
E ($W_p(S)$)=0
E ($W_p(T)$)=$W_p(T)$ [0.3*$W_c(S)$+0.7$W_c(T)$]
E ($W_p(R)$)=0
E($W_p(I)$)=0
E ($W_p(D)$)=$W_p(T)$ [0.6*$W_c(S)$+0.3*$W_c(T)$+0.1*$W_c(d)$]
E ($W_p(E)$)=0
Data Set-up Assumptions from SME:
node M2 is assigned the attack probability of 0.7 (derived from an attack tree computation);
Distribution of 0.7 into three threats (Social Engineering, Network Exploit and Data Tamper) based on their possible probability.
Social Engineering=0.4
Network Exploit=0.2
Data Tamper=0.1
STRIDE vector resultant if Social Engineering happens=[1, 0,1,1,0,0]
STRIDE vector resultant if Network Exploit happens=[0,0, 0,0,1,0]
STRIDE vector resultant if Data Tamper happens=[0,1,0,0, 0,1]
To Summarize the Attack Influence on Information Node in Information Flow View:
M2 has Attack probability of 0.7
M2 has 3 threats and their attack probability should aggregate to 0.7.
Therefore:
Threat STRIDE Attack Influence=Attack Probability * STRIDE vector
Social Engineering=0.4*[1,0,1,1,0,0]=[0.4,0,0.4,0.4,0,0]
Network Exploit=0.2*[0,0,0,0,1,1]=[0,0,0,0,0.2,0.2]
Data Tamper=0.1*[0,1,0,0,0,1]=[0,0.1,0,0,0,0.1]
Aggregated Threat STRIDE Attack Influence at node M2= [0.4,0,0.4,0.4,0,0]+[0,0,0,0,0.2,0]+[0,0.1,0,0,0,0.1]=[0.4, 0.1,0.4,0.4,0.2,0.3]

Thus all the computations are performed on the information view of the present disclosure. From FIG. 6A, it can be understood that nodes C1, C2 and C3 belong to device category 'Cloud', nodes G1, G2 and G3 belong to device category 'Gateway', and nodes M1, M2 and M3 belong to device category 'Mobile'.
Device Category Threats and STRIDE impact may be represented as—
Cloud=Attack1=[1,1,0,0,0,1]
Gateway=Attack2=[0,1,0,0,0,0]
Mobile=Attack3=[0,1,1,1,1,0]
STRIDE_INFLUENCE_VECTOR may be represented as—
Cloud=[0.5,0.6,0.2,0,0,0]
Gateway=[0.2,1,0,0,0,0]
Mobile=[0,1,1,1,1,0]
Say system transitions identified are—
Mobile to Cloud
Gateway to Cloud
In an embodiment, a bipartite graph of the transition from Mobile to Cloud may be represented as Matrix:

|   | $W_S$ | $W_T$ | $W_R$ | $W_I$ | $W_D$ | $W_E$ |
|---|---|---|---|---|---|---|
| $S_i$ | 0.4 | 0.15 | 0.10 | 0.15 | 0.15 | 0.35 |
| $T_i$ | 0 | 0.15 | 0 | 0.20 | 0 | 0.15 |
| $R_i$ | 0 | 0 | 0.35 | 0 | 0 | 0 |
| $I_i$ | 0.05 | 0.30 | 0.25 | 0.20 | 0 | 0 |
| $D_i$ | 0 | 0 | 0.10 | 0.15 | 0.25 | 0 |
| $E_i$ | 0.20 | 0.05 | 0.15 | 0.15 | 0.15 | 0.15 | wherein $W_S, W_T, W_R, W_I, W_D, W_E$ represent stride weights.

In an embodiment, a bipartite graph of the transition from Gateway to Cloud may be represented as Matrix:

|   | $S_j$ | $T_j$ | $R_j$ | $I_j$ | $D_j$ | $E_j$ |
|---|---|---|---|---|---|---|
| $S_i$ | 0.15 | 0.15 | 0.35 | 0.4 | 0.10 | 0.15 |
| $T_i$ | 0.15 | 0.20 | 0.15 | 0.15 | 0.05 | 0.10 |
| $R_i$ | 0.25 | 0.15 | 0.10 | 0.15 | 0.35 | 0.25 |
| $I_i$ | 0.30 | 0.20 | 0.10 | 0.05 | 0.25 | 0.10 |
| $D_i$ | 0.10 | 0.15 | 0.15 | 0.05 | 0.10 | 0.25 |
| $E_i$ | 0.05 | 0.15 | 0.15 | 0.20 | 0.15 | 0.15 |

Figure 7:
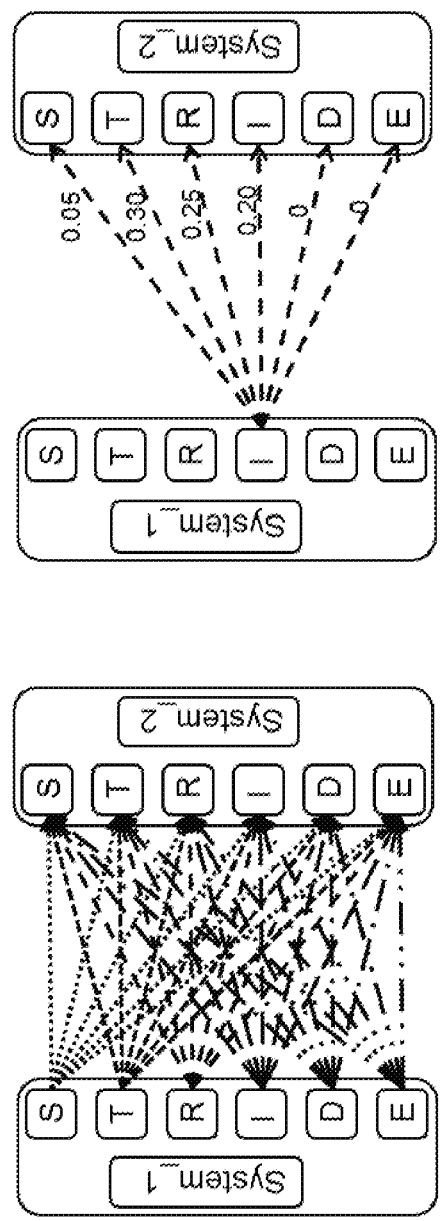
FIG. 7 illustrates another exemplary transition impact between STRIDE models of two systems, using bipartite graph, in accordance with the present disclosure.

FIG. 7 illustrates another exemplary transition impact between STRIDE models of two systems, using bipartite graph, in accordance with the present disclosure.
Links (Protocol Assignment is http for All Links is for Computation Understanding Only)
P1; Protocol=http; likelihood=0.5; Source=C1, Target=C2; InformationFlowC2>C1
P2; Protocol=http; likelihood=0.5; Source=C1; Target=C3; InformationFlowC3>C1
P3; Protocol=http; likelihood=1.0, Source=C2; Target=G1; InformationFlowG1>C2
P4; Protocol=http; likelihood=1.0; Source=C3; Target=M1; InformationFlowM1>C3
P5; Protocol=http; likelihood=0.4; Source=G1; Target=G2; InformationFlowG2>G1
P6; Protocol=http; likelihood=0.6; Source=G1; Target=G3; InformationFlowG3>G1
P7; Protocol=http; likelihood=0.7; Source=M1; Target=M2; InformationFlowM2>M1
P8; Protocol=http; likelihood=0.3; Source=M1; Target=M3; InformationFlowM3>M1
wherein P1 through P8 represent protocols for flow of information between nodes.
Likelihood constraint explanation
P1+P2=1>>0.5+0.5=1
P3=1>>1=1
P4=1>>1=1
P5+P6=1>>0.4+0.6=1
P7+P8=1>>0.7+0.3=1
Attack probability estimation may be represented as—
Attack_Probability(G2)+Attack_Probability(P5)=1
Attack_Probability(G3)+Attack_Probability(P6)=1
Attack_Probability(M2)+Attack_Probability(P7)=1
Attack_Probability(M3)+Attack_Probability(P8)=1
Attack Probability at C1, C2, C3 is same as they belong to same device category 'Cloud'.
Attack Probability at G1, G2, G3 is same as they belong to same device category 'Gateway'.
Attack Probability at M1, M2, M3 is same as they belong to same device category 'Mobile'.
In the exemplary embodiment, considering a heuristic approach to assign the attack probability (actual derivations maybe by SME using attack trees,
http: 0.4
Cloud: 0.6
Gateway: 0.6
Mobile: 0.6
In practice, attach probability may be assigned by subject matter experts (SME) using attack trees.
Attack Probability assignment constraint explanation:
Attack_Probability(G2)+Attack_Probability(http)=1>i.e. 0.6+0.4=1
Attack_Probability(G3)+Attack_Probability(http)=1>i.e. 0.6+0.4=1
Attack_Probability(M2)+Attack_Probability(http)=1>i.e. 0.6+0.4=1
Attack_Probability(M3)+Attack_Probability(http)=1>i.e. 0.6+0.4=1
Considering an exemplary scenario 1, wherein node M3 is attacked, C1 is the node of observance for complete system evaluation and attack computation starts at node M3.
Step 1
   Node M3 belongs to device category 'Mobile'.
      Mobile with attack=Attack3 and STRIDE impact=[0, 1,1,1,1,0].
      Mobile Attack Probability=0.6
   Therefore M3 attack risk impact=Attack Probability*STRIDE vector=0.6*[0,1,1,1,1,0]=[0,0.6, 0.6,0.6,0.6,0]
   Impact reaching node M1=Attack Risk Impact of M3*path Likelihood
   =[0,0.6,0.6,0.6,0.6,0]*0.3
   =[0,0.18,0.18,0.18,0.18,0]
   Therefore complete attack risk impact value reaching M1 from M3 via path P8 with likelihood of 0.3 is [0,0.18, 0.18,0.18,0.18,0]
Step 2
   Node M2 is not attacked and will contribute 0 to attack risk impact.
   Therefore complete attack risk impact value reaching M1 from M2 via path P7 with likelihood of 0.7 is [0,0,0, 0,0,0]
   Node M1 incorporates OR logic, therefore highest among incoming attack risk impact value should be considered.
   Therefore comparing values from M3 and M2, [0,0.18, 0.18,0.18,0.18,0] is assigned at node M1.
Step 3
   Evaluation on node G1, which is not impacted from child nodes {G2 and G3} will contribute 0 to attack risk impact.
   Therefore complete attack risk impact value reaching G1 from G2 and G3 is [0,0,0,0,0,0]
Step 4
   The attack risk impact from node M1 to C3 is: attack risk impact[M1]*path P4 likelihood i.e. [0,0.18,0.18,0.18, 0.18,0]*1=[0,0.18,0.18,0.18,0.18,0].
   So the STRIDE vector is impacted is TRID
   Now calculating the STRIDE_INFLUENCE_VECTOR of mobile to cloud:
   Bipartite matrix to be used:

|   |   | $W_S$ | $W_T$ | $W_R$ | $W_I$ | $W_D$ | $W_E$ |
|---|---|---|---|---|---|---|---|
| 0 | $S_i$ | 0.4 | 0.15 | 0.10 | 0.15 | 0.15 | 0.35 |
| 0.18 | $T_i$ | 0 | 0.15 | 0 | 0.20 | 0 | 0.15 |
| 0.18 | $R_i$ | 0 | 0 | 0.35 | 0 | 0 | 0 |
| 0.18 | $I_i$ | 0.05 | 0.30 | 0.25 | 0.20 | 0 | 0 |
| 0.18 | $D_i$ | 0 | 0 | 0.10 | 0.15 | 0.25 | 0 |
| 0 | $E_i$ | 0.20 | 0.05 | 0.15 | 0.15 | 0.15 | 0.15 |
|   | RESULT |   |   |   |   |   |   |

|   |   | 1 | 1 | 1 | 1 | 1 | 1 |
|---|---|---|---|---|---|---|---|
| 0 | $S_i$ | 0 | 0 | 0 | 0 | 0 | 0 |
| 0.18 | $T_i$ | 0 | 0.027 | 0 | 0.036 | 0 | 0.027 |
| 0.18 | $R_i$ | 0 | 0 | 0.063 | 0 | 0 | 0 |
| 0.18 | $I_i$ | 0.009 | 0.054 | 0.045 | 0.036 | 0 | 0 |
| 0.18 | $D_i$ | 0 | 0 | 0.018 | 0.027 | 0.045 | 0 |
| 0 | $E_i$ | 0 | 0 | 0 | 0 | 0 | 0 |
|   | RESULT | 0.009 | 0.081 | 0.126 | 0.099 | 0.045 | 0.027 |

Step 5

The attack risk impact from node G1 to C2 is: attack risk impact[G2]*path P3 likelihood i.e. [0,0,0,0,0,0]*1=[0,0,0,0,0,0].

At this stage attack risk impact at node C2 and C3 is
C2=[0,0,0,0,0,0]
C3=[0.009,0.081,0.126,0.099,0.045,0.027]

Step 6

The attack risk impact from node C3 to C1 is: attack risk impact[C3]*path P2 likelihood i.e.
[0.009,0.081,0.126,0.099,0.045,0.027]*0.5=[0.0045, 0.0405,0.063,0.0495,0.0225,0.0135]

The attack risk impact from node C2 to C1 is: attack risk impact[C2]*path P1 likelihood i.e. [0,0,0,0,0,0]*0.5= [0,0,0,0,0,0]

Node C1 incorporates AND logic, therefore aggregation of incoming attack risk impact value should be considered.

Therefore aggregating values from C2 and C3, [0.0045, 0.0405,0.063,0.0495,0.0225,0.0135]+[0,0,0,0,0,0]= [0.0045,0.0405,0.063,0.0495,0.0225,0.0135] is assigned at node C1 in information flow view, which is the complete system attack risk impact when node M3 is attacked.

Considering another exemplary scenario 2 wherein node M3 and path P8 are attacked, C1 is the node of observance for complete system evaluation and attack computation starts at node M3.

Step 1

Node M3 belongs to device category 'Mobile'.
Mobile with attack=Attack3 and STRIDE impact=[0, 1,1,1,1,0].
Mobile Attack Probability=0.6
Therefore M3 attack risk impact=Attack Probability*STRIDE vector=0.6*[0,1,1,1,1,0]=[0,0.6, 0.6,0.6,0.6,0]
Path connecting M3=P8; Therefore,
Path P8 belongs to protocol 'http'.
Mobile with attack=Attack4 and STRIDE impact=[1, 1,1,1,0,0].
Attack Probability=0.4
Therefore P8 attack risk impact=Attack Probability*STRIDE vector 0.4*[1,1,1,1,0,0]=[0.4,0.4, 0.4,0.4,0,0]
Impact reaching node M1=[Attack Risk Impact of M3 AND Attack Risk Impact of P8]*path Likelihood ={[0,0.6,0.6,0.6,0.6,0] AND [0.4,0.4,0.4,0.4,0,0]}*0.3, wherein AND refers to addition
=[0.12, 0.3, 0.3, 0.3, 0.18, 0]
Therefore complete attack risk impact value reaching M1 from M3 via path P8 with likelihood of 0.3 is [0.12, 0.3, 0.3, 0.3, 0.18, 0]

Step 2

Node M2 is not attacked and will contribute 0 to attack risk impact.

Therefore complete attack risk impact value reaching M1 from M2 via path P7 with likelihood of 0.7 is [0,0,0, 0,0,0]

Node M1 incorporates OR logic, therefore highest among incoming attack risk impact value should be considered.

Therefore comparing values from M3 and M2, [0.12, 0.3, 0.3, 0.3, 0.18, 0] is assigned at node M1.

Step 3

Evaluation on node G1, which is not impacted from child nodes {G2 and G3} will contribute 0 to attack risk impact.

Therefore complete attack risk impact value reaching G1 from G2 and G3 is [0,0,0,0,0,0]

Step 4

The attack risk impact from node M1 to C3 is: attack risk impact[M1]*path P4 likelihood i.e. [0.12, 0.3, 0.3, 0.3, 0.18, 0]*1=[0.12, 0.3, 0.3, 0.3, 0.18, 0].

Step 5

The attack risk impact from node G1 to C2 is: attack risk impact[G2]*path P3 likelihood i.e. [0,0,0,0,0,0]*1=[0, 0,0,0,0,0].

At this stage attack risk impact at node C2 and C3 is
C2=[0,0,0,0,0,0]
C3=[0.12, 0.3, 0.3, 0.3, 0.18, 0]

Step 6

The attack risk impact from node C3 to C1 is: attack risk impact[C3]*path P2 likelihood i.e. [0.12, 0.3, 0.3, 0.3, 0.18, 0]*0.5=[0.06, 0.15, 0.15, 0.15, 0.09, 0]

The attack risk impact from node C2 to C1 is: attack risk impact[C2]*path P1 likelihood i.e. [0,0,0,0,0,0]*0.5= [0,0,0,0,0,0]

Node C1 incorporates AND logic, therefore aggregation of incoming attack risk impact value should be considered.

Therefore aggregating values from C2 and C3, [0.06, 0.15, 0.15, 0.15, 0.09, 0]+[0,0,0,0,0,0]=[0.06, 0.15, 0.15, 0.15, 0.09, 0] is assigned at node C1 which is complete system attack risk impact when node M3 is attacked in information flow view.

In accordance with the present disclosure, the Business View enables management to visualize impact of any failure in the complete system. In an embodiment, the parameters of considerations are: Business Impact Loss {B}, Information Loss {I}, and Financial Impact Loss {F}. Business Impact Loss is termed in the lines of repudiation from other client contracts with regards to offering or accepting after the attack is successful. Information Loss is termed when attacker is successful is intercepting/tampering/deleting organization data. Financial Impact Loss is termed when attacker is successful in bringing down an entity and cause availability issues; cost impacting software reinstallation; impact of SLA in terms of financial loss.

In accordance with the present disclosure, the Business view computationally may be expressed as either the sum of weights or of probabilities as shown herein below. In an embodiment, the weights may be populated dynamically without user's intervention based on the information associated with the affected nodes/edges. Alternatively, the predefined weights may be over-ridden manually to enable risk assessment.

[Probability {B}+Probability {I}+Probability {F}]=1
[Weight {B}+Weight {I}+Weight {F}]=1

The probability distribution may be set based on the organization's priority.

In the exemplary scenario 1 discussed herein above, let B=0.5; I=0.3; F=0.2

Business Impact Loss=Probability {B}*complete system attack risk impact
=Sum [Probability {B}*complete system attack risk impact]
In the above example,
Business Impact Loss=0.5*[0.0045,0.0405,0.063,0.0495, 0.0225,0.0135]=[0.00225,0.02025,0.0315,0.02475, 0.01125,0.00675]=0.09675
Information Loss=Probability {I}*complete system attack risk impact =Sum [Probability {I}*complete system attack risk impact]
In the above example,
Information Loss=0.3*[0.0045,0.0405,0.063,0.0495, 0.0225,0.0135]=[0.00135,0.01215,0.0189,0.01485, 0.00675,0.00405]=0.05805
Financial Impact Loss=Probability {F}*complete system attack risk impact;
=Sum [Probability {F}*complete system attack risk impact]
In the above example,
Financial Impact Loss=0.2*[0.0045,0.0405,0.063,0.0495, 0.0225,0.0135]=[0.0009,0.0081,0.0126,0.0099,0.0045, 0.0027]=0.0387

In the exemplary scenario 2 discussed herein above, let B=0.5; I=0.3; F=0.2
Business Impact Loss=Probability {B}*complete system attack risk impact.
=0.5*[0.06, 0.15, 0.15, 0.15, 0.09, 0]
=[0.03, 0.075, 0.075, 0.075, 0.045, 0]
=0.3
Information Loss Impact=Probability {I}*complete system attack risk impact.
=0.3*[0.06, 0.15, 0.15, 0.15, 0.09, 0]
=[0.018, 0.045, 0.045, 0.045, 0.027, 0]
=0.18
Financial Impact Loss=Probability {F}*complete system attack risk impact.
=0.2*[0.06, 0.15, 0.15, 0.15, 0.09, 0]
=[0.012, 0.03, 0.03, 0.03, 0.018, 0]
=0.12

Figure 8:
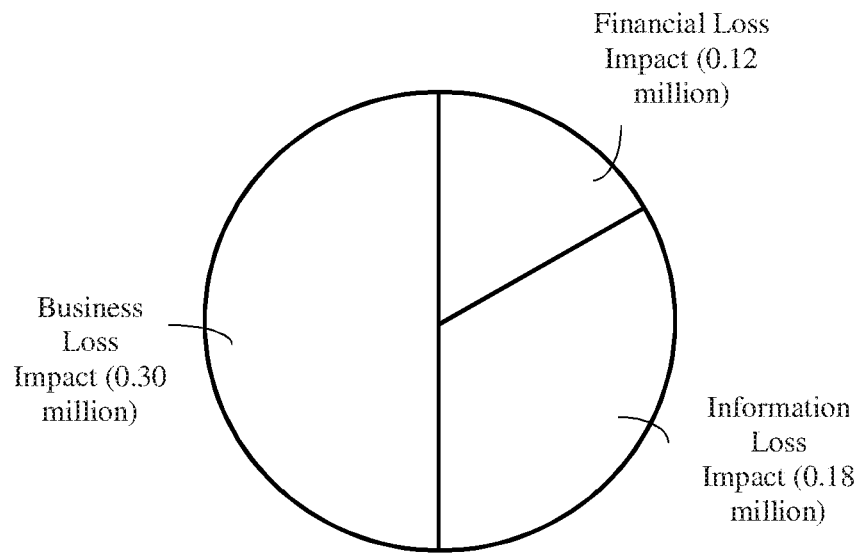
FIG. 8 illustrates a business view in accordance with the present disclosure wherein the Business Impact Loss; Information Loss Impact and Financial Impact Loss are represented as Currency Loss metric in a Pie Chart.
Figure 9:
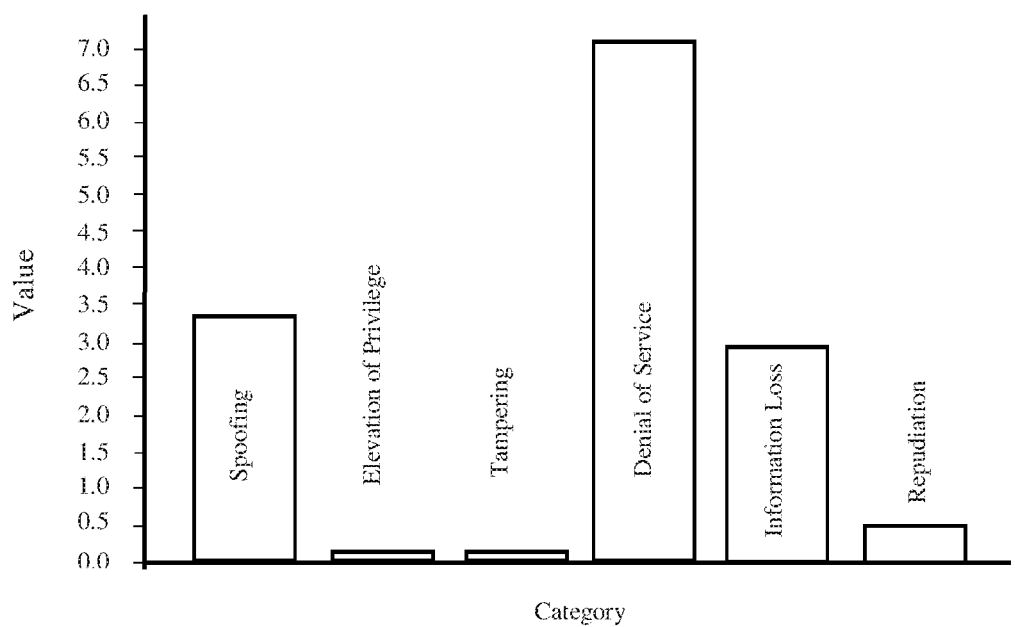
FIG. 9 illustrates various impacts that may be viewed as an output of a threat model in accordance with the present disclosure.
Figure 10:
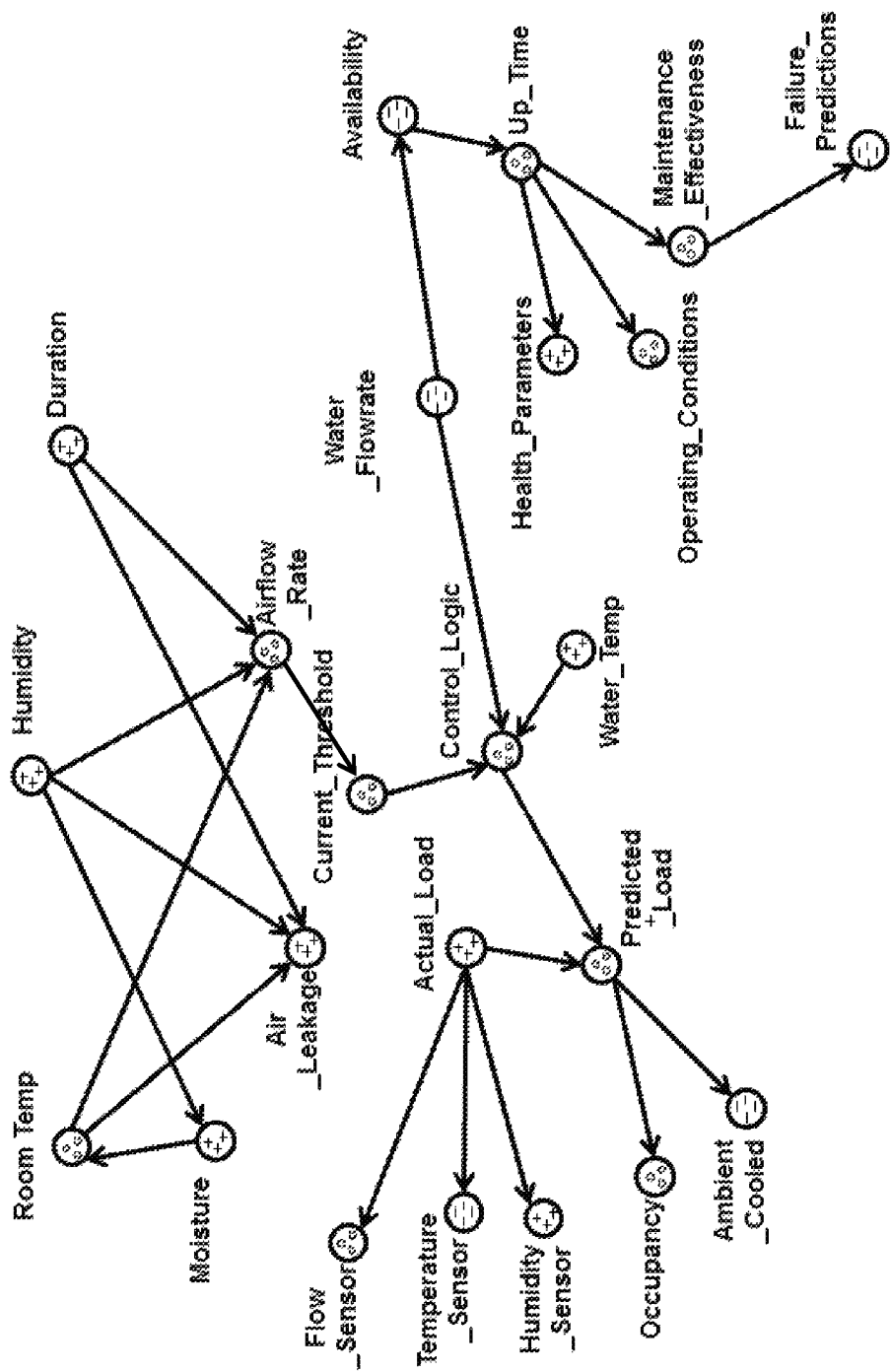
FIG. 10 illustrates a security view in accordance with the present disclosure.

In an exemplary embodiment, as illustrated in FIG. 8, the business view of the present disclosure may represent the Business Impact Loss; Information Loss Impact and Financial Impact Loss as Currency Loss metric in a Pie Chart. FIG. 9 illustrates various impacts that may be viewed as an output of a threat model such as spoofing, elevation of privilege, tampering, denial of service, information loss and repudiation, in accordance with the present disclosure. FIG. 10 illustrates a security view in accordance with an embodiment of the present disclosure, wherein circles with different patterns are used to indicate different levels of security levels such as high, low or medium.

In accordance with an embodiment of the present disclosure, the method 200 further comprises generating a mitigation plan based on one or more of the business impact loss, the information loss impact and the financial impact loss, wherein the mitigation plan comprises one or more of: providing one or more alternate source or path for the data to be derived or propagated respectively; modifying constraints imposed on the information flow from logical conjunction ("AND") to logical disjunction ("OR") or vice-versa; isolating at least one of the one or more affected nodes and affected paths therebetween; deploying data encryption scheme; and implementing diagnostic measures to measure health of the network.

In an embodiment, providing one or more alternate source or path for the data to be derived or propagated may involve restoring parameters of Efficiency: providing alternate source/path for the data to propagate towards the source node may affect in reduced efficiency in terms of computation time as the alternate source/path may result in increased route path.

Accuracy: providing alternate source/path for the data to propagate towards the source node may affect in reduced accuracy in terms of data information lost in the affected path.

Privacy Concerns: in system function continuity scheme the derived information may be extracted from alternate sources of information. These alternate sources of information may result in revealing private parameters of the node which may also be referred to as information loss/leakage. There may be an overall impact on Confidentiality Integrity Availability [CIA] parameters.

In an embodiment, modifying constraints imposed on the information flow from logical conjunction ("AND") to logical disjunction ("OR") or vice-versa may involve following scenarios and corresponding implications:

If, ∩—AND and ∪—OR
Dependency Change Over from AND to OR—

$$F(x)=F(x_1 \cap x_2) \Rightarrow F(x)=F(x_1 \cup x_2)$$

Implications: Changing the constraint from AND to OR will remove stringent implication over necessity of information flow and the system continues to provide functionality. In such a scenario, system accuracy is reduced as there is information loss.

Dependency Change Over from OR to AND—

$$F(x)=F(x_1 \cup x_2) \Rightarrow F(x)=F(x_1 \cup x_2)$$

Changing the constraint from OR to AND will apply stringent implication over necessity of all the information flow towards the source. Therefore when a leaf node is attacked, the root node will stop to provide functionality. In such a scenario, system accuracy is reduced as there is information loss. There might be a situation where system availability is also questionable.

Dependency Change Over k Out of n—
Directly changing the constraint from OR to AND will completely question the efficiency and service availability of the system. To continue to provide system functionality; the constraints may be leveraged to provide a balance. The solution is to mandate 'k' conditions out of 'n'.

In an embodiment, isolating at least one of the nodes or links and paths therebetween will completely remove dependency of information. This will definitely hamper system efficiency, availability and may also result in privacy issues.

In an embodiment, deploying data encryption scheme is a form of control mechanism so that the attack impact is nullified. For instance, if there is a man in the middle attack (MiTM) attack, as a control mechanism data encryption scheme may be deployed so that data is scrambled and MiTM attack in future will have no impact. Thereby Confidentiality and Integrity are restored.

In an embodiment, implementing diagnostic measures to measure health of the network is a process where the system health is examined by representing each node as a variable and relate their relationship using: Sum-Of-Products or Product-Of-Sum. Alternatively, a context-free grammar language such as Backus-Normal-Form (BNF) method may be used.

In accordance with the present disclosure, mitigation can be decided based on a more granular data available from the information flow view and both attack and risk analysis tradeoff can be appropriately done for mitigation.

Although threat models are evolved using inputs from Subject Matter Experts (SME), risk assessment in accordance with the present disclosure enables use of any threat model known in the art, thereby making the solution flexible and improves usability.

In accordance with the present disclosure, an attack may be simulated and a "what if" conditional analysis assessment may be conducted to understand the system behavior under failure scenarios. In an embodiment, given initial information of the system and its configurations may be changed and combined with "what If" analysis.

In accordance with the present disclosure, in the security level view, systems and methods of the present disclosure facilitate analyses of the vulnerability of a system under consideration and grade degree of security of a node like low, medium, high.

Thus, systems and methods of the present disclosure provide a framework to completely evaluate interconnected systems under consideration; threat modeling, risk assessment and business view assessment under different representations of interconnected systems, computing cascading effect with impacted node on its neighbors, evaluating interconnected systems with different views (Information flow View, Deployment View, Business View, Security level view) reflecting impact simultaneously in each layer, providing mitigation plans which will reflect reduced risk in the business view and incorporating attack tree simulations to evaluate dynamic behavior of a system under attack.

The written description describes the subject matter herein to enable any person skilled in the art to make and use the embodiments of the present disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A hardware processor implemented method for risk assessment in a heterogeneous dynamic network in real time, the method being implemented on a server, comprising:

receiving, by the hardware processor, data pertaining to information flow between a plurality of nodes identified in the heterogeneous dynamic network (202);

identifying, by the hardware processor, one or more affected nodes from the plurality of nodes and one or more affected paths there between (204);

computing, by the hardware processor, attack risk at the one or more affected nodes (206);

computing, by the hardware processor, a propagated risk on one or more neighboring nodes of the one or more affected nodes by:

receiving one or more pre-defined bipartite graphs of transitions based on at least one of attack vectors and influence vectors; and estimating, by the hardware processor, attack probability based on the one or more pre-defined bipartite graphs of transitions and pre-defined weights assigned to the propagated risk, wherein the estimation of attack probability is associated with a probability of selection of a path in the heterogeneous dynamic network; and computing, by the hardware processor, an aggregated risk at the one or more affected nodes based on the propagated risk;

computing, by the hardware processor, an impact propagation at the one or more affected nodes based on the aggregated risk.

2. The hardware processor implemented method of claim 1 further comprising computing, by the hardware processor, one or more of business impact loss, information loss impact and financial impact loss based on the aggregated risk.

3. The hardware processor implemented method of claim 2 further comprising generating, by the hardware processor, a mitigation plan based on one or more of the business impact loss, the information loss impact and the financial impact loss, the mitigation plan comprising one or more of:

providing, by the hardware processor, one or more alternate sources or paths for the data to be derived or propagated respectively;

modifying, by the hardware processor, constraints imposed on the information flow from logical conjunction to logical disjunction or vice-versa;

isolating, by the hardware processor, at least one of the one or more affected nodes or the one or more affected paths there between;

deploying, by the hardware processor, a data encryption scheme; and implementing, by the hardware processor, diagnostic measures to measure a health of the heterogeneous dynamic network.

4. The hardware processor implemented method of claim 2, wherein the business impact loss is based on a weight or a probability associated with business impact loss and the aggregated risk; the information loss impact is based on the weight or the probability associated with information loss and the aggregated risk; and the financial impact loss is based on the weight or the probability associated with financial impact loss and the aggregated risk.

5. The hardware processor implemented method of claim 1, further comprising computing, by the hardware processor, the attack risk by identifying attack vectors in the network and the influence vectors corresponding to the propagated risk of the attack vectors on the neighboring nodes.

6. The hardware processor implemented method of claim 1, further comprising simulating, by the hardware processor, a "what-if" condition wherein an attack is simulated to affect one or more nodes and conducting a conditional analysis assessment.

7. A system for risk assessment in a heterogeneous dynamic network in real time, the system being implemented on a server, the system comprising:

one or more data storage devices (102) operatively coupled to one or more hardware processors (104) and configured to store instructions configured for execution by the one or more hardware processors to:

receive data pertaining to information flow between a plurality of nodes identified in the heterogeneous dynamic network (202);

identify one or more affected nodes from the plurality of nodes and one or more affected paths there between (204);

compute attack risk at the one or more affected nodes (206);

compute a propagated risk on one or more neighboring nodes of the one or more affected nodes by:

receiving one or more pre-defined bipartite graphs of transitions based on at least one of attack vectors and influence vectors; and estimating attack probability based on the one or more pre-defined bipartite graphs of transitions and pre-defined weights assigned to the propagated risk, wherein the estimation of attack probability is associated with a probability of selection of a path in the heterogeneous dynamic network; and compute an aggregated risk at the one or more affected nodes based on the propagated risk;

compute, an impact propagation at the one or more affected nodes based on the aggregated risk.

8. The system of claim 7, wherein the one or more hardware processors are further configured to compute one or more of business impact loss, information loss impact and financial impact loss based on the aggregated risk.

9. The system of claim 8, wherein the one or more hardware processors are further configured to generate a mitigation plan based on one or more of the business impact loss, the information loss impact and the financial impact loss, the mitigation plan comprising one or more of:

providing one or more alternate source or path for the data to be derived or propagated respectively;

modifying constraints imposed on the information flow from logical conjunction to logical disjunction or vice-versa;

isolating at least one of the one or more affected nodes or the one or more affected paths there between;

deploying a data encryption scheme;

implementing diagnostic measures to measure a health of the heterogeneous dynamic network;

computing an attack risk by identifying attack vectors in the heterogeneous dynamic network and influence vectors corresponding to the propagated risk of the attack vectors on the neighboring nodes and simulating a "what-if" condition wherein an attack is simulated to affect one or more nodes and a conditional analysis assessment is conducted.

10. The system of claim 8, wherein the business impact loss is based on a weight or a probability associated with business impact loss and the aggregated risk; the information loss impact is based on the weight or the probability associated with information loss and the aggregated risk; and the financial impact loss is based on the weight or the probability associated with financial impact loss and the aggregated risk.

11. A computer program product comprising a non-transitory computer readable medium having a computer readable program embodied therein, wherein the computer readable program, when executed on a computing device, causes the computing device to:

receive data pertaining to information flow between a plurality of nodes identified in a heterogeneous dynamic network (202);

identify one or more affected nodes from the plurality of nodes and one or more affected paths there between (204);

compute attack risk at the one or more affected nodes;

compute the propagated risk on neighboring nodes of the one or more affected nodes by:

receiving one or more pre-defined bipartite graphs of transitions based on at least one of attack vectors and influence vectors; and estimating, by the hardware processor, attack probability based on the one or more pre-defined bipartite graphs of transitions and pre-defined weights assigned to the propagated risk, wherein the estimation of attack probability is associated with a probability of selection of a path in the heterogeneous dynamic network; and compute an aggregated risk at the one or more affected nodes based on the propagated risk;

compute an impact propagation at the one or more affected nodes based on the aggregated risk.

12. The computer program product of claim 11, wherein the computer readable program further causes the computing device to perform one or more of:

computing one or more of business impact loss, information loss impact and financial impact loss based on the aggregated risk;

generating a mitigation plan based on one or more of the business impact loss, the information loss impact and the financial impact loss, the mitigation plan comprising one or more of:

providing one or more alternate source or path for the data to be derived or propagated respectively;

modifying constraints imposed on the information flow from logical conjunction to logical disjunction or vice-versa;

isolating at least one of the one or more affected nodes or the one or more affected paths there between deploying a data encryption scheme; and implementing diagnostic measures to measure a health of the heterogeneous dynamic network;

computing an attack risk by identifying attack vectors in the network and influence vectors corresponding to the propagated risk of the attack vectors on the neighboring nodes; and simulating a "what-if" condition wherein an attack is simulated to affect one or more nodes and a conditional analysis assessment is conducted.

* * * * *